US010571997B2

(12) United States Patent
Dawson et al.

(10) Patent No.: US 10,571,997 B2
(45) Date of Patent: *Feb. 25, 2020

(54) WORKLOAD ROUTING FOR MANAGING ENERGY IN A DATA CENTER

(71) Applicant: International Business Machines Corporation, Armonk, NY (US)

(72) Inventors: Christopher J. Dawson, Arlington, VA (US); Vincenzo V. Diluoffo, Sandy Hook, CT (US); Rick A. Hamilton, II, Charlottesville, VA (US); Michael D. Kendzierski, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/142,583

(22) Filed: Apr. 29, 2016

(65) Prior Publication Data

US 2016/0246350 A1 Aug. 25, 2016

Related U.S. Application Data

(63) Continuation of application No. 14/299,101, filed on Jun. 9, 2014, now Pat. No. 9,361,161, which is a
(Continued)

(51) Int. Cl.
*G06F 1/32* (2019.01)
*G06F 1/329* (2019.01)
(Continued)

(52) U.S. Cl.
CPC ............ *G06F 1/329* (2013.01); *G06F 1/3203* (2013.01); *G06F 9/4881* (2013.01); *G06F 9/505* (2013.01);
(Continued)

(58) Field of Classification Search
CPC ...... G06F 1/3203; G06F 1/329; G06F 9/4881; G06F 9/4893; G06F 9/505; G06F 9/5083; G06F 9/5094; Y02B 60/142; Y02B 60/144
See application file for complete search history.

(56) References Cited

U.S. PATENT DOCUMENTS

| 6,795,928 B2 * | 9/2004 | Bradley ................. G06F 1/206 700/22 |
| 7,031,321 B2 | 4/2006 | Habetha |

(Continued)

FOREIGN PATENT DOCUMENTS

JP 2007072768 A2 4/2004

OTHER PUBLICATIONS

Wilson, Robert W., U.S. Appl. No. 12/342,444, Office Action dated Apr. 30, 2010, 14 pages.
(Continued)

*Primary Examiner* — Fahmida Rahman
(74) *Attorney, Agent, or Firm* — James R. Nock; Maxine L. Barasch; Keohane & D'Alessandro PLLC (57) ABSTRACT

Approaches that manage energy in a data center are provided. In one embodiment, there is an energy management tool, including an analysis component configured to determine a current energy profile of each of a plurality of systems within the data center, the current energy profile comprising an overall rating expressed as an integer value, the overall rating calculated based on a current workload usage and environmental conditions surrounding each of the plurality of systems; and a priority component configured to prioritize a routing of a workload to a set of systems from the plurality of systems within the data center having the least
(Continued)

amount of energy present based on a comparison of the overall ratings for each of the plurality of systems within the data center.

18 Claims, 4 Drawing Sheets

Related U.S. Application Data continuation of application No. 12/488,580, filed on Jun. 21, 2009, now Pat. No. 8,799,690.

(51) Int. Cl.
  *G06F 1/3203* (2019.01)
  *G06F 9/50* (2006.01)
  *G06F 9/48* (2006.01)

(52) U.S. Cl.
  CPC .......... *G06F 9/5094* (2013.01); *G06F 9/4893* (2013.01); *G06F 9/5083* (2013.01)

(56) References Cited

U.S. PATENT DOCUMENTS

| | | | |
|---|---|---|---|
| 7,441,135 | B1 | 10/2008 | Chan et al. |
| 7,768,995 | B2 | 8/2010 | Yang et al. |
| 7,995,480 | B2 | 8/2011 | Tarkoma |
| 8,799,690 | B2 | 8/2014 | Dawson et al. |
| 2002/0042887 | A1 | 4/2002 | Chauvel et al. |
| 2003/0061091 | A1 | 3/2003 | Amaratunga et al. |
| 2004/0268166 | A1 | 12/2004 | Farkas et al. |
| 2005/0055590 | A1 | 3/2005 | Farkas et al. |
| 2006/0291404 | A1 | 12/2006 | Thubert et al. |
| 2007/0089446 | A1 | 4/2007 | Larson et al. |
| 2007/0240006 | A1 | 10/2007 | Fung |
| 2007/0240121 | A1 | 10/2007 | Spangler |
| 2007/0271475 | A1 | 11/2007 | Hatasaki et al. |
| 2008/0178029 | A1 | 7/2008 | McGrane et al. |
| 2009/0109230 | A1 | 4/2009 | Miller et al. |
| 2009/0228726 | A1 | 9/2009 | Malik et al. |
| 2009/0259345 | A1 | 10/2009 | Kato et al. |
| 2009/0265568 | A1 | 10/2009 | Jackson |
| 2009/0276528 | A1 | 11/2009 | Pienta et al. |
| 2010/0058350 | A1 | 3/2010 | Boss et al. |
| 2010/0158004 | A1 | 6/2010 | Wilson et al. |
| 2010/0228861 | A1* | 9/2010 | Arsovski ............... G06F 9/5027 709/226 |
| 2010/0325453 | A1 | 12/2010 | Dawson et al. |
| 2011/0107332 | A1 | 5/2011 | Bash |
| 2014/0289732 | A1 | 9/2014 | Dawson et al. |

OTHER PUBLICATIONS

Wilson, Robert W., U.S. Appl. No. 12/342,444, Office Action dated Sep. 24, 2010, 14 pages.
Wilson, Robert W., U.S. Appl. No. 12/342,444, Notice of Allowance & Fees Due dated Apr. 5, 2011, 8 pages.
Rahman, Fahmida, U.S. Appl. No. 12/488,580, Office Action dated Aug. 17, 2011, 20 pages.
Rahman, Fahmida, U.S. Appl. No. 12/488,580, Office Action dated Dec. 20, 2011, 19 pages.
Rahman, Fahmida, U.S. Appl. No. 12/488,580, Office Action dated Aug. 16, 2013, 22 pages.
Rahman, Fahmida, U.S. Appl. No. 12/488,580, Office Action dated Dec. 4, 2013, 12 pages.
Rahman, Fahmida, U.S. Appl. No. 12/488,580, Notice of Allowance & Fees Due dated Mar. 31, 2014, 24 pages.
Rahman, Fahmida, U.S. Appl. No. 14/299,101, Office Action dated Jun. 10, 2015, 15 pages.
Rahman, Fahmida, U.S. Appl. No. 14/299,101, Final Office Action dated Dec. 4, 2015, 23 pages.
Rahman, Fahmida, U.S. Appl. No. 14/299,101, Notice of Allowance dated Mar. 14, 2016, 17 pages.

* cited by examiner

WORKLOAD ROUTING FOR MANAGING ENERGY IN A DATA CENTER

RELATED U.S. APPLICATION DATA

This application is a continuation of, and claims the benefit of, co-pending and co-owned U.S. patent application Ser. No. 14/299,101, filed Jun. 9, 2014, the entire contents of which are herein incorporated by reference. U.S. patent application Ser. No. 14/299,101 is a continuation of commonly owned U.S. patent application Ser. No. 12/488,580, filed Jun. 21, 2009, U.S. Pat. No. 8,799,690, issued Aug. 5, 2014, the entire contents of which are herein incorporated by reference.

FIELD OF THE INVENTION

This invention discloses an approach for managing energy. Specifically, the present invention provides a solution for policy-based energy management.

BACKGROUND OF THE INVENTION

For many companies, the amount of time, money and people required to manage components in a data center has made managing service availability more difficult. Commodity hardware and virtualization technologies using data center virtualization attempt to reduce traditional energy requirements. Data center virtualization is the process of aligning resources with the needs of services. Virtualization technology enables creation of a set of logical resources that share underlying physical resources. A group of resources, such as servers, applications, databases, and networks, behave as a single resource from which all services are drawn. It requires application components, access software, virtualized operating systems, storage, etc. A key challenge to this has been provisioning and managing these complex environments to ensure cost-effective, efficient service.

SUMMARY OF THE INVENTION

Approaches that manage energy in a data center are provided. In one embodiment, there is an energy management tool, including an analysis component configured to determine a current energy profile of each of a plurality of systems within the data center, the current energy profile comprising an overall rating expressed as an integer value, the overall rating calculated based on a current workload usage and environmental conditions surrounding each of the plurality of systems; and a priority component configured to prioritize a routing of a workload to a set of systems from the plurality of systems within the data center having the least amount of energy present based on a comparison of the overall ratings for each of the plurality of systems within the data center.

In one embodiment, there is a method for managing energy in a data center comprising: determining, via at least one computing device, a current energy profile of each of a plurality of systems within the data center, the current energy profile comprising an overall rating expressed as an integer value, the overall rating calculated based on a current workload usage and environmental conditions surrounding each of the plurality of systems; and prioritizing, via the at least one computing device, a routing of a workload to a set of systems from the plurality of systems within the data center having the least amount of energy present based on a comparison of the overall ratings for each of the plurality of systems within the data center.

In a second embodiment, there is a computer system for managing energy in a data center comprising: at least one processing unit; memory operably associated with the at least one processing unit; and an energy management tool storable in the memory and executable by the at least one processing unit, the energy management tool comprising: an analysis component configured to determine a current energy profile of each of a plurality of systems within the data center, the current energy profile comprising an overall rating expressed as an integer value, the overall rating calculated based on a current workload usage and environmental conditions surrounding each of the plurality of systems; and a priority component configured to prioritize a routing of a workload to a set of systems from the plurality of systems within the data center having the least amount of energy present based on a comparison of the overall ratings for each of the plurality of systems within the data center.

In a third embodiment, there is a computer-readable storage device storing computer instructions, which when executed, enables a computer system to manage energy in a data center, the computer instructions comprising: instructions for determining a current energy profile of each of a plurality of systems within the data center, the current energy profile comprising an overall rating expressed as an integer value, the overall rating calculated based on a current workload usage and environmental conditions surrounding each of the plurality of systems; and instructions for prioritizing a routing of a workload to a set of systems from the plurality of systems within the data center having the least amount of energy present based on a comparison of the overall ratings for each of the plurality of systems within the data center.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to managing energy within a data center to optimize the energy characteristics and improve the overall energy efficiency of the data center. In these embodiments, an energy management tool provides this capability. Specifically, the energy management tool comprises: an analysis component configured to determine a current energy profile of each of a plurality of systems within the data center, the current energy profile comprising an overall rating expressed as an integer value, the overall rating calculated based on a current workload usage and environmental conditions surrounding each of the plurality of systems; and a priority component configured to prioritize a routing of a workload to a set of systems from the plurality of systems within the data center having the least amount of energy present based on a comparison of the overall ratings for each of the plurality of systems within the data center. As such, the energy management tool optimizes the power consumption and energy efficiency of a data center's workload distribution.

Figure 1:
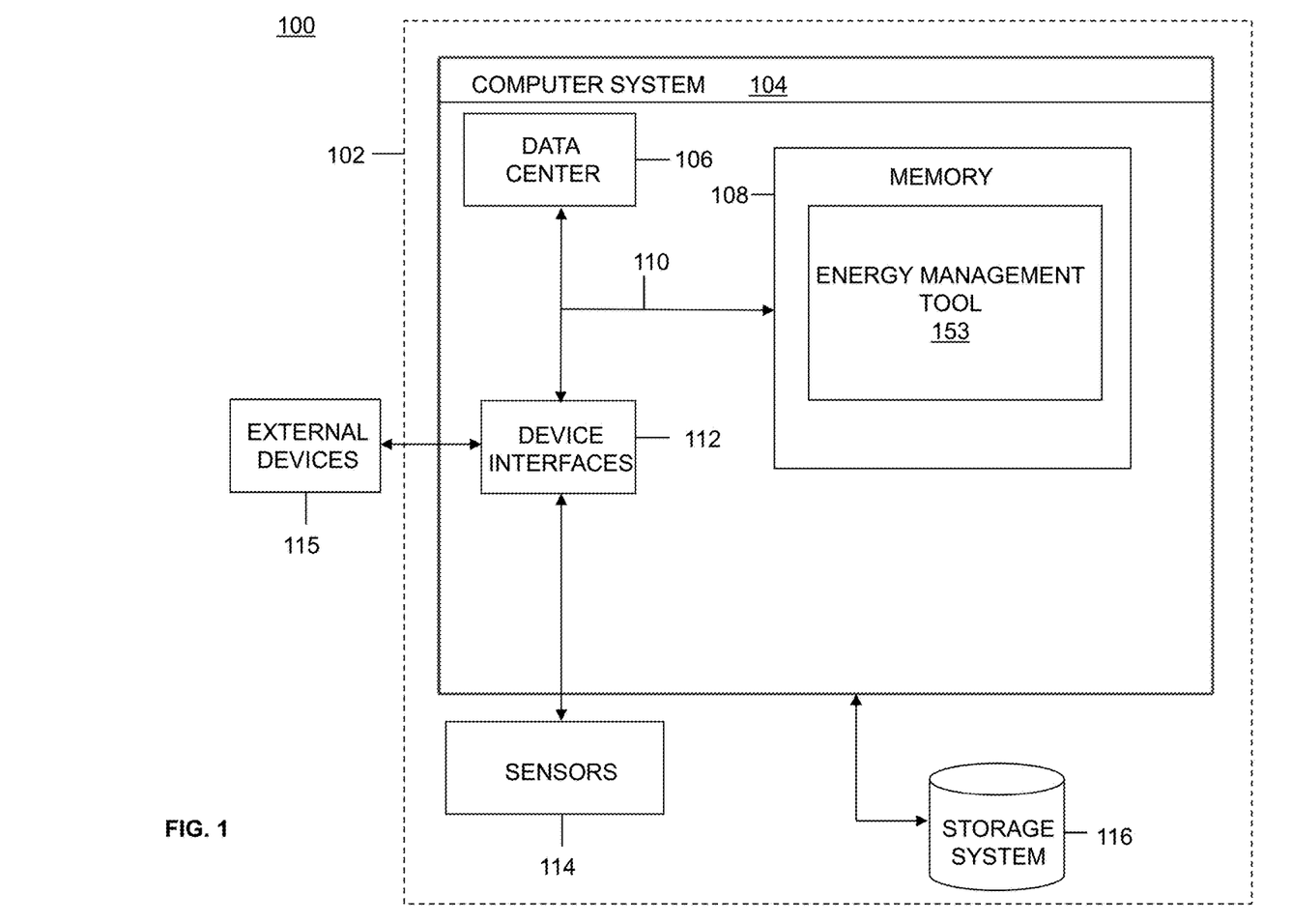
FIG. 1 shows a schematic of an exemplary computing environment in which elements of the present invention may operate.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for managing energy in a data center. It should be understood that any other computers implemented under the present invention may have different components/software, but will perform similar functions. As shown, computer system 104 includes a data center 106 containing a plurality of systems (e.g., a grid of servers) 16 (FIG. 2), each responsible for managing a portion of data center 106. Also shown is memory 108 for storing an energy management tool 153, a bus 110, and device interfaces 112.

Computer system 104 is shown communicating with a set of sensors 114 that communicate with bus 110 via device interfaces 112. Sensors 114 capture data representing attributes of the environment surrounding each of plurality of systems 16 including, but not limited to: temperature, humidity, airflow, carbon emissions, etc. Sensors 114 can include any type of sensor capable of capturing environmental attributes within data center 106.

Data center 106 collects and routes signals representing outputs from sensors 114 to energy management tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, sensors 114 are capable of two-way communication, and thus can receive signals (to power up, to sound an alert, etc.) from energy management tool 153.

While executing computer program code, data center 106 can read and/or write data to/from memory 108 and storage system 116. Storage system 116 can store virtually any type of environmental, workload, or system data, such as sensor data from sensors 114. Storage system 116 can include VCRs, DVRs, RAID arrays, USB hard drives, optical disk recorders, flash storage devices, image analysis devices, general purpose computers, video enhancement devices, de-interlacers, scalers, and/or other data processing and storage elements.

Although not shown, computer system 104 could also include I/O interfaces that communicate with one or more external devices 115 that enable a user to interact with computer system 104 (e.g., a keyboard, a pointing device, a display, etc.).

Figure 2:
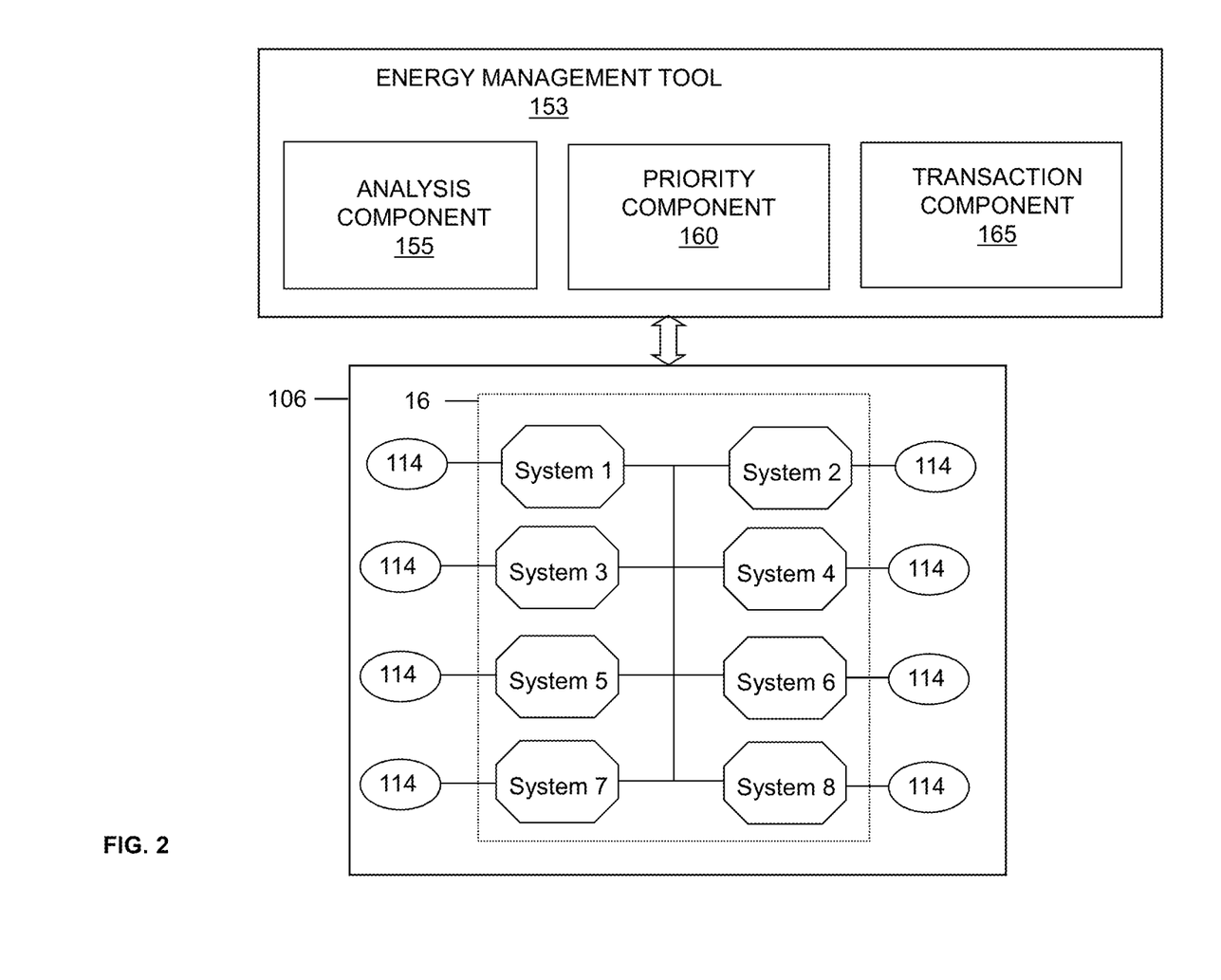
FIG. 2 shows a more detailed view of an energy management tool that operates in the environment shown in FIG. 1.

FIG. 2 shows a more detailed view of energy management tool 153 according to embodiments of the invention. As will be described in the exemplary embodiment herein, energy management tool 153, in combination with implementation 100, is configured to route workloads to the system(s) within data center 106 having the least amount of energy present, i.e., systems that produce the least amount of heat, consume the least amount of power, or which are currently underutilized while running in a "cool spot" (e.g., a location with relatively low environmental temperature and humidity levels). Workloads may be sent to systems that are consuming or producing low amounts of energy such that systems, networks and storage components that are currently consuming large amounts of energy may be avoided or used sparingly. This helps maximize the energy efficiency of data center 106 and reduces the energy usage of the overall implementation.

Figure 3:
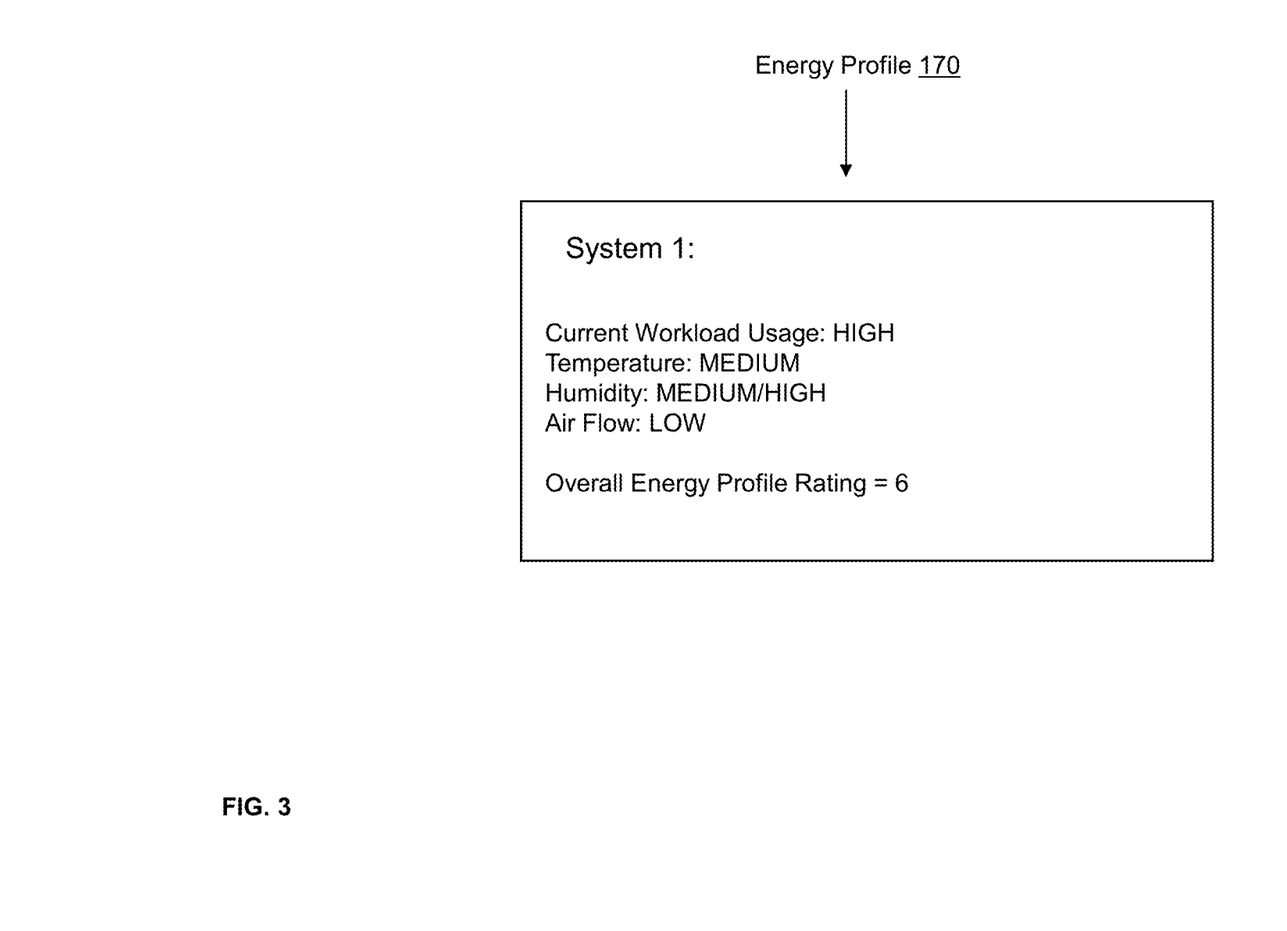
FIG. 3 shows an exemplary energy profile for a system operating within a data center.

To accomplish this, the energy characteristics of each of plurality of systems 16 must be examined to produce an energy profile 170 (FIG. 3) for each system. As shown in FIGS. 2-3, energy management tool 153 comprises an analysis component 155 configured to determine an energy profile 170 of each of plurality of systems 16 within data center 106. Based on the analysis, a priority component 160 (e.g., a workload scheduler) is configured to prioritize a routing of a workload to a set of systems from plurality of systems 16 within data center 106 having the least amount of energy present based on energy profile 170 of each of plurality of systems 16 within data center 106.

In one embodiment, energy management tool 153 routes workload to systems that may be more viable targets for consuming/producing less energy, and away from systems that may be in zones within data center 106 that are relatively hot or are already operating at a specified threshold for energy use. To accomplish this, priority component 160 is configured to prioritize the routing of the workload to the set of systems from plurality of systems 16 within data center based on the current workload usage of each of plurality of systems 16 within data center 106 and the environmental conditions surrounding each of plurality of systems 16 within data center 106. Specifically, priority component 160 optimizes energy management within data center 106 by routing the workload to those systems that are currently operating within an acceptable (e.g., low) environmental and current workload usage range, which may be predefined, or dynamically updated as system and environmental factors change.

To accomplish this, analysis component 155 is configured to determine the current workload usage of each of plurality of systems 16 within data center 106, wherein the current workload usage of each of plurality of systems 16 within data center 106 comprises at least one of the following: future workload requirements, application priorities, location of each of plurality of systems 16 within data center 106, or time of day. Analysis component 155 is further configured to determine environmental conditions surrounding each of plurality of systems 16 within data center 106 gathered by sensors 114. For example, as shown in FIG. 3, energy profile 170 is generated for system 1 within data center 106. The workload and environmental conditions are gathered and input to energy profile 170 to produce an overall energy profile rating. In this non-limiting example, system 1 is given an overall energy profile rating of '6' based on the workload and environmental conditions surrounding system 1. In this embodiment, the overall energy profile rating may be calculated and assigned a numerical value ranging from 0-7 that corresponds to the amount of energy present, as follows:

- (0) to (1) may signify that the system has a very low current workload usage and favorable environmental conditions (e.g., very low temperature and humidity levels, as well as high air flow);
- (2) to (3) may indicate that the system has a medium to high current workload usage, or a low to medium workload usage but unfavorable environmental conditions;
- (4) to (5) may indicate that the system has both medium to high current workload usage and unfavorable environmental conditions; and
- (6) to (7) may indicate a high to very high current workload usage and unfavorable environmental conditions, wherein (7) represents a very negative energy profile and a system that should be avoided if possible.

Priority component 160 uses these energy profile ratings to determine the relative priority between each of plurality of systems 16, as will be further described below. The above numerical designation represents one non-limiting example. It will be appreciated that other gradients could likewise be defined, such that higher or lower order states (i.e., more or fewer conditions) could similarly be employed while still keeping within the scope of the present invention.

Figure 4:
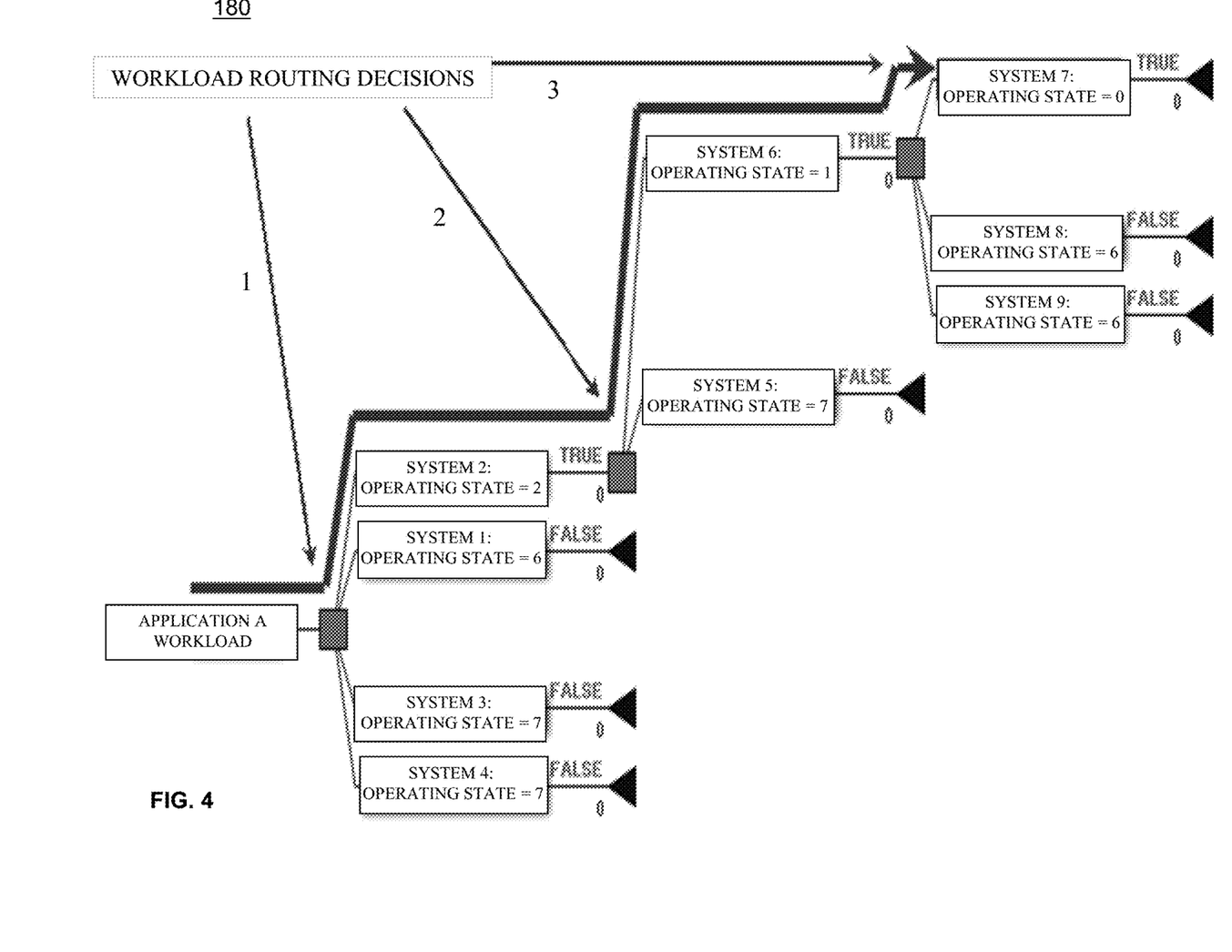
FIG. 4 shows a workflow diagram for prioritizing a routing of a workload using the energy management tool shown in FIGS. 1-2.

Referring now to FIG. 4, the present invention will be described in the context of the following workflow model 180. In this example, environmental and current workload usage data is collected from systems 1-8 (FIG. 2) and used to build workflow model 180, which demonstrates an optimized job workload and/or schedule for a workload of Application A (e.g., an e-mail). As shown, at workload routing decision 1, the operating states of systems 1-4 are analyzed. System 1 has an operating state of "6," in this case indicating that the system is currently processing a high current workload, and is operating in a relatively high temperature, high humidity area of data center 106. As shown, systems 2-4 have operating states of "2," "7," and "7" respectively, indicating that systems 3 and 4 are currently processing a very high current workload level in unfavorable environmental conditions. System 2 has an operating state of "2," indicating it has a relatively low workload usage level and favorable environmental conditions. Based on the operating states of systems 1-4, Application A workload is routed to system 2. The same process is performed at decision points 2 and 3 based on the various operating states of systems 5-9. As shown, system 2, system 6 and system 7 participate in the workload due to their low utilization and the requirement to avoid systems that are running in areas with unfavorable environmental conditions.

After the workload for Application A is routed, process flow 180 is repeated for the next application. It will be appreciated that this workflow represents one possible workflow for prioritizing the routing of a workload, and that other approaches are possible within the scope of the present invention.

As described herein, the present invention allows for the management of energy within a data center by running an application workload in the most optimal location based on environmental and system variables. The present invention prioritizes the routing of workload jobs to systems within data center 106 with the lowest excess heat distribution and/or lowest power consumption. As such, energy efficiency and energy costs within data center 106 are optimized.

In another embodiment of this invention, energy management tool 153 is used as a service to charge fees managing energy in the data center. Specifically, as shown in FIG. 2, energy management tool 153 comprises a transaction component 165 configured to charge a management fee for the management of energy within data center 106. For example, a data center operator or a third party service provider could offer this energy management as a service by performing the functionalities described herein on a subscription and/or fee basis.

Further, it can be appreciated that the methodologies disclosed herein can be used within a computer system to manage energy, as shown in FIG. 1. In this case, energy management tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, and program modules. Communication media also includes any information delivery media.

It is apparent that there has been provided with this invention an approach for prioritizing workloads to manage energy within a data center. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for managing energy in a data center, the method comprising:
   determining a current energy profile of each of a plurality of systems within the data center, the current energy profile comprising an overall rating based on workload requirements and environmental temperature, wherein the overall rating is a numerical integer on a scale of integers;
   prioritizing a routing of a workload to a set of systems from the plurality of systems within the data center having a least amount of energy present based on a comparison of the overall ratings for each of the plurality of systems within the data center;
   routing the workload to an intermediate system that is within the set of systems within the data center based on the prioritization;
   detecting a change in system and environmental factors in response to the routing the workload to the intermediate system;
   dynamically updating the routing in response to the detecting; and
   charging a fee based on a subscription in exchange for performing of the determining, prioritizing, routing, detecting, and dynamically updating.

2. The method according to claim 1, further comprising determining a current workload usage of each of the plurality of systems within the data center, wherein the overall rating is based on the current workload usage.

3. The method according to claim 1, further comprising analyzing at least one environmental condition surrounding each of the plurality of systems within the data center, and wherein the overall rating is based on the analysis.

4. The method according to claim 1, wherein the overall rating is expressed as an integer value on a relative scale.

5. The method according to claim 2, wherein the current workload usage of each of the plurality of systems within the data center comprises at least one of the following: future workload requirements, location of each of the plurality of systems within the data center, or time of day.

6. The method according to claim 1 further comprising charging a management fee for the management of energy in the data center.

7. A computer system for managing energy in a data center comprising:
   at least one processing unit;
   memory operably associated with the at least one processing unit; and
   an energy management tool storable in the memory and executable by the at least one processing unit, the energy management tool comprising:
   an analysis component configured to determine a current energy profile of each of a plurality of systems within the data center, the current energy profile comprising an overall rating based on workload requirements and environmental temperature, wherein the overall rating is a numerical integer on a scale of integers;
   a priority component configured to prioritize a routing of a workload to a set of systems from the plurality of systems within the data center having a least amount of energy present based on a comparison of the overall ratings for each of the plurality of systems within the data center, and wherein the priority component is further configured to route the workload to an intermediate system that is within the set of systems within the data center based on the prioritization;
   wherein the analysis component is further configured to detect a change in system and environmental factors in response to the routing the workload to the intermediate system; and
   the priority component is further configured to dynamically update the routing in response to the detecting; and
   a component configured to charge a fee based on a subscription in exchange for performing of the determining, prioritizing, routing, detecting, and dynamically updating.

8. The energy management tool according to claim 7, the analysis component further configured to determine a current workload usage of each of the plurality of systems within the data center, wherein the overall rating is based on the current workload usage.

9. The energy management tool according to claim 7, the analysis component further configured to analyze at least one environmental condition surrounding each of the plurality of systems within the data center, wherein the overall rating is based on the analysis.

10. The energy management tool according to claim 7, wherein the overall rating is expressed as an integer value on a relative scale.

11. The energy management tool according to claim 8, wherein the current workload usage of each of the plurality of systems within the data center comprises at least one of the following: future workload requirements, location of each of the plurality of systems within the data center, or time of day.

12. The energy management tool according to claim 7 further comprising a transaction component configured to charge a management fee for the management of energy in the data center.

13. A non-transitory computer-readable hardware storage device storing computer instructions, which when executed, enables a computer system to manage energy in a data center, the computer instructions comprising:
   instructions for determining a current energy profile of each of a plurality of systems within the data center, the current energy profile comprising an overall rating based on workload requirements and environmental temperature, wherein the overall rating is a numerical integer on a scale of integers;
   instructions for prioritizing a routing of a workload to a set of systems from the plurality of systems within the data center having a least amount of energy present based on a comparison of the overall ratings for each of the plurality of systems within the data center;

instructions for routing the workload to an intermediate system that is within the set of systems within the data center based on the prioritization;
instructions for detecting a change in system and environmental factors in response to the routing the workload to the intermediate system;
instructions for dynamically updating the routing in response to the detecting; and
instructions for charging a fee based on a subscription in exchange for performing of the determining, prioritizing, routing, detecting, and dynamically updating.

14. The non-transitory computer-readable hardware storage device according to claim 13, further comprising instructions for determining a current workload usage of each of the plurality of systems within the data center, wherein the overall rating is based on the current workload usage.

15. The non-transitory computer-readable hardware storage device according to claim 13, further comprising instructions for analyzing at least one environmental condition surrounding each of the plurality of systems within the data center, wherein the overall rating is based on the analysis.

16. The non-transitory computer-readable hardware storage device according to claim 13, wherein the overall rating is expressed as an integer value on a relative scale.

17. The non-transitory computer-readable hardware storage device according to claim 14, wherein the current workload usage of each of the plurality of systems within the data center comprises at least one of the following: future workload requirements, location of each of the plurality of systems within the data center, or time of day.

18. The non-transitory computer-readable hardware storage device according to claim 13, further comprising computer instructions for charging a management fee for the management of energy in the data center.

* * * * *